United States Patent
Imamori et al.

(10) Patent No.: US 9,534,678 B2
(45) Date of Patent: Jan. 3, 2017

(54) POWER TRANSMISSION DEVICE FOR VEHICLE

(71) Applicant: HONDA MOTOR CO., LTD., Tokyo (JP)

(72) Inventors: Satoshi Imamori, Wako (JP); Makoto Tsuchihashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/906,988

(22) PCT Filed: Feb. 26, 2015

(86) PCT No.: PCT/JP2015/055680
§ 371 (c)(1),
(2) Date: Jan. 22, 2016

(87) PCT Pub. No.: WO2015/146467
PCT Pub. Date: Oct. 1, 2015

(65) Prior Publication Data
US 2016/0160980 A1    Jun. 9, 2016

(30) Foreign Application Priority Data
Mar. 25, 2014   (JP) ................................. 2014-062737

(51) Int. Cl.
*F16H 37/08*   (2006.01)
*F16H 48/19*   (2012.01)
(Continued)

(52) U.S. Cl.
CPC ................ *F16H 48/19* (2013.01); *F16D 9/06* (2013.01); *F16H 35/10* (2013.01); *F16H 48/22* (2013.01);
(Continued)

(58) Field of Classification Search
CPC .................................. F16H 48/08; F16H 35/10
(Continued)

(56) References Cited

U.S. PATENT DOCUMENTS 4,411,635 A * 10/1983 Boothroyd ................ F16D 9/08
403/2
4,932,280 A * 6/1990 Becker .................... F04D 13/02
464/183

(Continued)

FOREIGN PATENT DOCUMENTS

JP    02-026321 A    1/1990
JP    09-112643 A    5/1997

(Continued)

OTHER PUBLICATIONS

International Search Report dated May 26, 2015 corresponding to International Patent Application No. PCT/JP2015/055680.

*Primary Examiner* — Ha D Ho
(74) *Attorney, Agent, or Firm* — Squire Patton Boggs (US) LLP

(57) ABSTRACT

In a power transmission device for a vehicle, a boss portion of a clutch guide, which is an input-side rotation member of a clutch unit, includes: a spline portion spline-connected to a small-diameter portion at one end of a center shaft which is an input shaft; and a fitting portion that extends further from the spline portion in an axial direction to contact the outer circumference of a medium-diameter portion of the center shaft. A recess functioning as a torque fuse is formed in the medium-diameter portion of the center shaft corresponding to the fitting portion. When the center shaft is severed or disconnected at the recess, the medium-diameter portion of the severed cut center shaft can still remain within the fitting portion, so that appropriate centering can be secured and stable self-propulsion of the vehicle can be (Continued)

secured without unwanted misalignment of the axis of rotation of the clutch.

4 Claims, 2 Drawing Sheets

(51) Int. Cl.
*F16D 9/06* (2006.01)
*F16H 48/22* (2006.01)
*F16H 35/10* (2006.01)
*F16D 25/0638* (2006.01)
*F16H 48/34* (2012.01)
*F16H 48/14* (2006.01)

(52) U.S. Cl.
CPC ......... *F16D 25/0638* (2013.01); *F16H 48/145* (2013.01); *F16H 48/147* (2013.01); *F16H 2035/103* (2013.01); *F16H 2048/343* (2013.01)

(58) Field of Classification Search
USPC ................ 74/665 H, 607, 411; 475/430, 431
See application file for complete search history.

(56) References Cited

U.S. PATENT DOCUMENTS

| | | | | |
|---|---|---|---|---|
| 4,971,267 A * | 11/1990 | Fulton | ................... | B64C 13/24 244/99.9 |
| 5,186,079 A * | 2/1993 | Gee | ........................ | B60K 17/22 403/2 |
| 5,584,776 A * | 12/1996 | Weilant | .............. | B60K 17/3505 180/233 |
| 5,690,002 A * | 11/1997 | Showalter | .......... | B60K 23/0808 192/35 |
| 6,070,495 A | 6/2000 | Kuroda et al. | | |
| 8,047,919 B2 * | 11/2011 | Arden | ....................... | F16D 1/02 403/2 |
| 2013/0319150 A1 | 12/2013 | Carlton et al. | | |

FOREIGN PATENT DOCUMENTS

| | | |
|---|---|---|
| JP | 10-194003 A | 7/1998 |
| JP | 2004-044618 A | 2/2004 |
| JP | 2009-150484 A | 7/2009 |
| JP | 5025904 B2 | 9/2012 |
| JP | 2013-249951 A | 12/2013 |

* cited by examiner

POWER TRANSMISSION DEVICE FOR VEHICLE

TECHNICAL FIELD

The present invention relates generally to power transmission devices for vehicles and more particularly to a torque fuse (most torsionally-frangible portion or fracturing portion for emergency) in a power transmission shaft of a four-wheel drive vehicle.

BACKGROUND ART

Patent Literatures 1, 2 and 3 identified below disclose torque-distribution type power transmission devices in four-wheel drive vehicles. More specifically, Patent Literature 1 discloses that a clutch for connecting and disconnecting drive power transmission is provided between a center drive shaft for transmitting rotary motion of a drive source (engine) to rear wheels and a differential unit for the rear wheels, and that switching is made between two-wheel drive and four-wheel drive through connection and disconnection, by the clutch, of the drive power transmission. Further, Patent Literatures 2 and 3 disclose that clutches are provided in corresponding relation to left and right wheels in a differential unit for the rear wheels, and that drive power is distributed to the left and right wheels through connection and disconnection, by the individual clutches, of the drive power transmission. If abnormality, such as galling or a spike (i.e., sharp rise) in clutch-pressing hydraulic pressure, has occurred in any of the clutches taking part in drive power distribution between the front and rear wheels in such a four-wheel drive vehicle, the front wheels and the rear wheels would be undesirably interconnected directly (namely, undesired drive force would be transmitted to both or either of the left and right wheels by the clutch being locked in an ON or engaged state), so that torque may undesirably increase sharply. In such a situation, cases and gears may get broken, and oil leakage, fire, etc. may occur. As a fail-safe function to obviate such risks, it has been conventional to provide a torque fuse (i.e., most torsionally-frangible portion or fracturing portion for emergency) in a suitable portion of a power transmission shaft. Namely, the most torsionally-frangible portion or fracturing portion for emergency in the form of a notch (recess) or the like is formed in the suitable portion of the power transmission shaft, so that, when torque exceeding a predetermined critical value has been applied to the power transmission shaft, the power transmission shaft is broken or fractured at the notch (recess) so as to free the rotation of the shaft. Such a portion (i.e., most torsionally-frangible portion or fracturing portion for emergency), formed in the power transmission shaft in such a manner that it has a reduced strength as a design approach and thus can be fractured when torque exceeding an acceptable range has been applied, is called a torque fuse.

With the conventionally-known technique, however, the torque fuse is provided in a desired portion without appropriate consideration being made about the position where the torque fuse should be provided. Particularly, with the conventionally-known technique, such a torque fuse is not provided in a shaft portion that is to be connected with a rotation member (e.g., input-side rotation member) of the clutch; that is, it has been common to form the torque fuse in a shaft portion avoiding the connecting portion with the clutch. But, if the conventional torque-fuse-formed portion is disconnected or severed, the axis of the rotation member of the clutch would get misaligned, so that the clutch may irregularly whirling (move around violently) to prevent stable self-propelled rotation.

PRIOR ART LITERATURE

Patent Literature 1: Japanese Patent Application Laid-open Publication No. 2004-044618
Patent Literature 2: Japanese Patent Application Laid-open Publication No. HEI-10-194003
Patent Literature 3: Japanese Patent No. 5025904

SUMMARY OF INVENTION

It is therefore an object to provide an improved power transmission device for a vehicle which, with a torque fuse provided in an appropriate manner, can prevent a clutch from irregularly whirling in case a power transmission shaft is severed at the torque fuse.

According to the present invention, there is provided an improved power transmission apparatus for a vehicle, which comprises: an input shaft (4) to which is transmitted rotary motion from a drive source; a clutch (5 or 6) for transmitting rotary motion of the input shaft by disconnectably connecting drive power transmission; and an output shaft (7 or 8) connected to the clutch, characterized in that the input shaft is spline-connected at one end thereof to an input-side rotation member (51) of the clutch for rotating together with the input-side rotation member of the clutch, in that the input-side rotation member of the clutch includes a boss portion (55) that includes a spline portion (55*a*) spline-connected to the one end of the input shaft, and a fitting portion (55*b*) extending further from the spline portion in an axial direction into contact with an outer periphery of the input shaft, and in that a portion of the input shaft that corresponds to the fitting portion has a recess (9) formed therein for functioning as a torque fuse.

According to the present invention, the boss portion of the input-side rotation member of the clutch includes the spline portion and the fitting portion, and the recess (9) functioning as the torque fuse is provided in the portion of the input shaft that positionally corresponds to the fitting portion (55*b*) located inward of a spline-connecting portion at one end of the input shaft. Thus, when the input shaft has been disconnected or severed at the torque fuse due to application of excessive torque, the severed input shaft can still remain within the fitting portion (55*b*) of the clutch unit, so that appropriate centering of the shaft can be secured so as to avoid misalignment of the axis of rotation of the clutch. Thus, even when the input shaft has been severed at the torque fuse, the present invention allows safe rotation of the input shaft and can secure stable self-propelled rotation, preventing the clutch from irregularly whirling (moving around violently). Preferably, the recess (9) functioning as the torque fuse may be provided in correspondence with a portion of the fitting portion (55*b*) adjacent to the spline portion (55*a*) (i.e., near a boundary between the fitting portion and the spline portion). Thus, it is possible to minimize the length of the fitting portion (55*b*) that is required to secure stability at and after the severance of the shaft. Namely, in order to secure stability at and after the severance of the shaft, it is necessary that the portion of the input shaft still remaining within the fitting portion after the severance should have more than a given minimum necessary length. However, with the recess provided in positional correspondence with the portion of the fitting portion adjacent to the spline portion, the length of the input shaft still remaining within the fitting portion at and after the severance can be maximized. Thus, the necessary length of the fitting portion can be minimized, which can significantly contribute to size reduction of the power transmission device.

In an embodiment of the present invention, the power transmission apparatus is a differential mechanism (10) for distributing rotation of a drive shaft (1), to which is transmitted the rotary motion from the drive source, to left and right wheels. The differential mechanism includes: a driving bevel gear (3) rotatable integrally with the drive shaft (1); a driven bevel gear (4) meshing with the driving bevel gear (3); a center shaft (4) extending in a direction intersecting the drive shaft (1) and rotatable integrally with the driven bevel gear (3); left and right clutch units (5, 6) disposed to left and right of the center shaft; and left and right output shafts (7, 8) for transmitting outputs of the left and right clutch units to the left and right wheels, respectively. Further, the center shaft includes: a middle large-diameter portion (4a); left and right medium-diameter portions (4b) located to left and right of the large-diameter portion; and left- and right-end small-diameter portions (4c) adjoining the left and right medium-diameter portions, the driven bevel gear being fixed to the large-diameter portion. Further, the above-mentioned input shaft is the center shaft (4), the clutch is the left or right clutch unit (5 or 6), and the output shaft is the left or right output shaft (7 or 8). Further, the boss portion (55) of the input-side rotation member (51) of the clutch is spline-connected to the small-diameter portion (4c) of the center shaft, and the recess portion (9) functioning as the torque fuse is formed in the medium-diameter portion (4b) of the center shaft. Thus, the torque fuse structure of the present invention is applicable to each of the left and right clutch units of the differential mechanism designed for distributing drive power to the left and right wheels.

DESCRIPTION OF EMBODIMENTS

Figure 1:
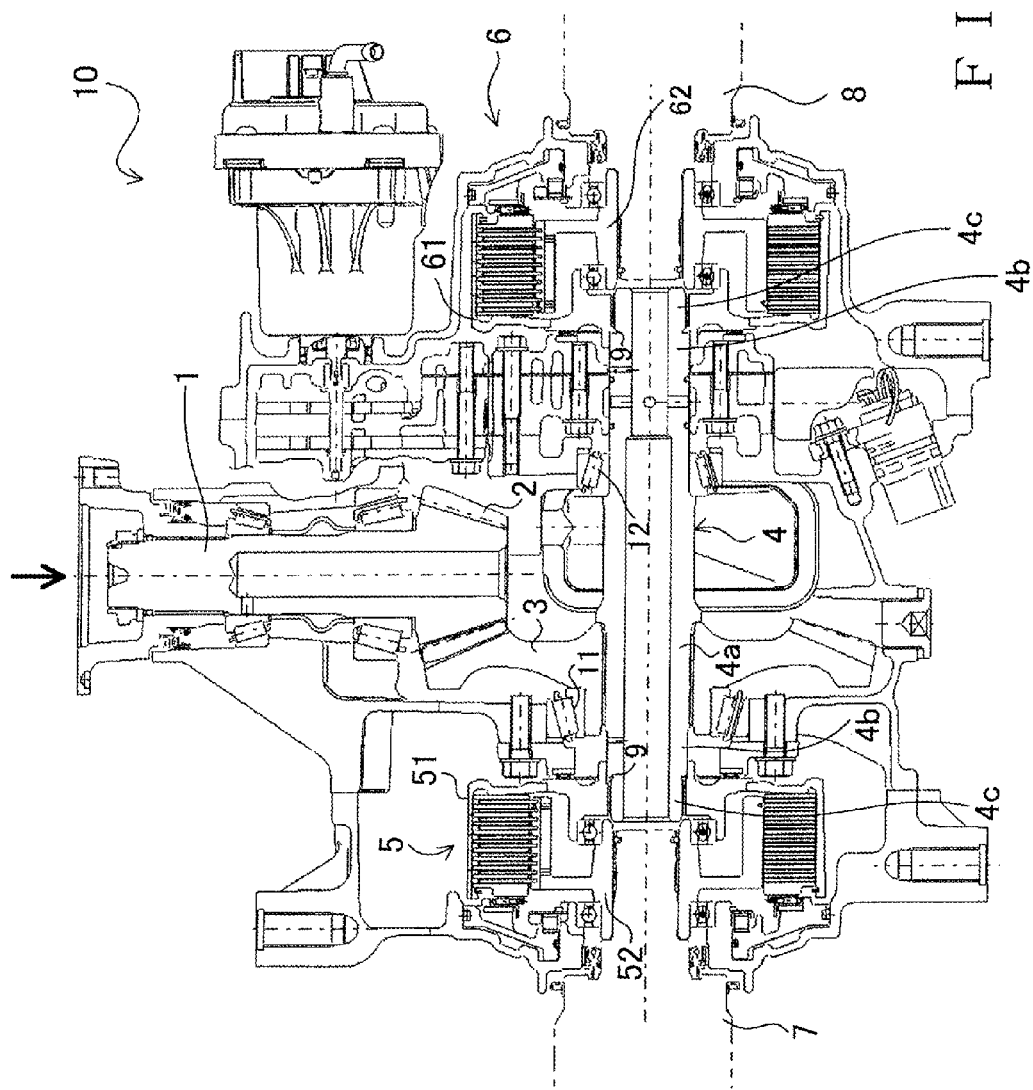
FIG. 1 is a sectional view showing an embodiment of a power transmission device for a vehicle of the present invention which is constructed as a differential mechanism.

An embodiment of a power transmission device for a vehicle (vehicular power transmission device) of the present invention shown in FIG. 1 is constructed as a differential mechanism 10 for distributing rotation of a drive shaft 1 to left and right wheels (not shown). The drive shaft 1 is connected to a not-shown propeller shaft so that rotary motion is transmitted from a not-shown drive source (engine) to the drive shaft 1. The differential mechanism 10 includes: a driving bevel gear 2 rotatable integrally with the drive shaft 1; a driven bevel gear 3 meshing with the driving bevel gear 2; a center shaft 4 disposed to extend in a direction intersecting the drive shaft 1 and connected to the driven bevel gear 3 for integral rotation with the driven bevel gear 3; clutch units 5 and 6 disposed to the left and right of the center shaft 4; and left and right output shafts 7 and 8 for transmitting respective outputs of the clutch units 5 and 6 to the left and right wheels (not shown), respectively. The center shaft 4 is supported by a case of the differential mechanism 10 via tapered roller bearings 11 and 12.

The center shaft 4 is constructed to generally include a middle large-diameter portion 4a constituting a middle part of the center shaft 4, medium-diameter portions 4b located to the left and right of the large-diameter portion 4a, and left- and right-end small-diameter portions 4c adjoining the medium-diameter portions 4c. The driven bevel gear 3 is fixed to the large-diameter portion 4a to rotate the entire center shaft 4. The left- and right-end small-diameter portions 4c each have a plurality of spline teeth formed therein at intervals along the circumference thereof and are spline-connected to input-side rotation members of corresponding ones of the clutch units 5 and 6 for rotating together with the input-side rotation members.

Figure 2:
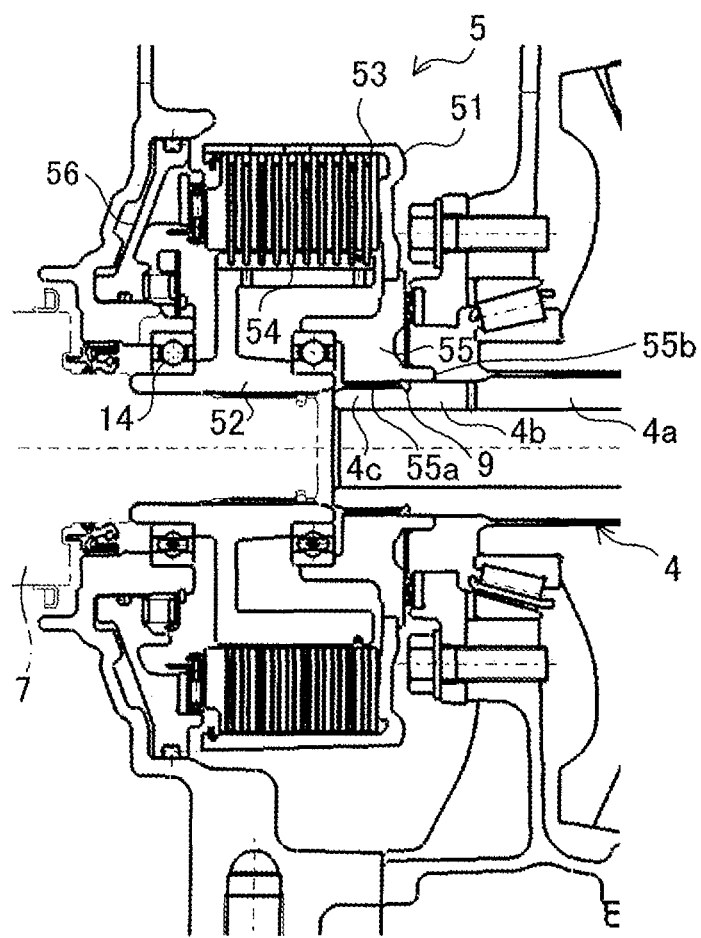
FIG. 2 is an enlarged sectional view of portions pertaining to a left clutch unit in the embodiment of the power transmission device.

The left and right clutch units 5 and 6 each comprise a multiple plate wet clutch. In the left clutch unit 5, as shown in an enlarged view of FIG. 2, a plurality of separator plates 53 sequentially arranged at predetermined intervals in an axial direction is spline-connected to a clutch guide 51 that is the input-side rotation member of the clutch unit 5, and a plurality of friction plates 54 sequentially arranged at predetermined intervals in the axial direction is spline-connected to a clutch hub 52 that is an output-side rotation member of the clutch unit 5. The separator plates 53 and the friction plates 54 are arranged alternately in the axial direction in combinations. The clutch guide (input-side rotation member) 51 includes a boss portion 55 where a spline portion 55a is formed on its proximal portion and spline-connected to the left-end small-diameter portion 4c. The boss portion 55 also has a fitting portion 55b extending further from the spline portion 55a in the axial direction and closely contacting the outer periphery of the left medium-diameter portion 4b of the center shaft 4 fitted within the fitting portion 55b.

A recess (notch, cut or hollow) 9 functioning as a torque fuse is formed, with a suitable depth, in the outer periphery of a portion (i.e., medium-diameter portion 4b) of the center shaft 4 that corresponds to the fitting portion 55b of the boss portion 55 of the clutch guide (input-side rotation member) 51. The recess 9, which is in the form of an appropriate amount of a nick, a cut or a hollow, has predetermined characteristics such that it can sufficiently withstand normal torque applied to the center shaft 4 but is fractured, broken or severed when more than predetermined torque has been applied to the center shaft 4. Formation of such a recess 9 weakens a mechanical strength of the portion (medium-diameter portion 4b) of the center shaft 4 so that the portion (medium-diameter portion 4b) of the center shaft 4 may be fractured, broken or severed due to application of more than predetermined torque (i.e., excessive torque). However, the recess 9 of the center shaft 4 is provided in a portion corresponding to the fitting portion 55b of the clutch unit 5 as noted above, and thus, when the center shaft 4 has been disconnected or severed at the recess 9 due to excessive torque, the portion of the severed shaft 4 adjacent to the large-diameter portion 4a can still remain within the fitting portion 55b of the clutch unit 5. Because the portion of the severed shaft 4 adjacent to the large-diameter portion 4a is supported by the case of the differential mechanism 10 via the tapered roller bearings 11 and 12 as noted above, axis misalignment of the shaft 4 can be avoided despite the severance or cut-off of the torque fuse. With the portion of the severed shaft 4 adjacent to the large-diameter portion 4a still remaining within the fitting portion 55b at and after the severance or cut-off of the torque fuse, appropriate centering of the axis of rotation of the clutch unit 5 can be secured so as to avoid misalignment of the axis of rotation of the clutch unit 5. In this way, the instant embodiment can secure stable self-propelled rotation at and after the cut-off the torque fuse.

Note that, in the illustrated example, the recess 9 is formed or provided in positional correspondence with a portion of the fitting portion 55b adjacent to the spline portion 55a (i.e., in the neighborhood of a boundary between the fitting portion 55b and the spline portion 55a). Thus, it is possible to minimize the length of the fitting portion 55b that is required to secure stability at and after the cut-off or severance of the torque fuse. Namely, in order to secure stability (appropriate centering of the clutch's axis of rotation) at and after the severance, it is necessary that the portion of the severed shaft 4 adjacent to the large-diameter portion 4a should have more than a given necessary minimum length. However, with the position of the recess 9 in the illustrated example, the length of the portion of the severed shaft 4 adjacent to the large-diameter portion 4a still remaining within the fitting portion 55b after the cut-off of the torque fuse extends along a substantially entire length of the fitting portion 55b. Thus, the length of the fitting portion 55b can be limited to the smallest-possible or minimal length that is required to secure stability, which can significantly contribute to size reduction of the power transmission device. Needless to say, the present invention is not necessarily limited to the above-described embodiment. For example, the recess 9 may be provided in positional correspondence with a substantially middle position of the fitting portion 55b, in which case, however, it would be necessary to increase the entire length of the fitting portion 55b, e.g. to a length about two times the length of the fitting portion 55b in the illustrated example.

Further, the clutch hub 52 is spline-connected to the output shaft 7 and rotatably fixed to the clutch case via a bearing 14 so that it can rotate integrally with the output shaft 7. The clutch guide 51 and the clutch hub 52, on the other hand, are supported by each other via a bearing 13 so that they are rotatable relative to each other. The plurality of separator plates 53 spline-connected to the clutch guide 51 is driven in the axial direction (rightward in FIG. 2) by a piston 56 when the clutch is in an engaged state. The clutch is brought to the engaged state by the separator plates 53 frictionally engaging the friction plates 54 in response to drive power given from the piston 53. The piston 56 is driven hydraulically and controlled to provide a necessary clutch engaging amount.

Referring now back to FIG. 1, the right clutch unit 6 may be constructed in the same manner to the aforementioned left clutch unit 5 and thus will not be described here to avoid unnecessary duplication. In the right clutch unit 6, the recess 9 functioning as a torque fuse is formed in the right medium-diameter portion 4b of the center shaft 4, in the same manner as in the above-described left clutch unit 5. Note that the center shaft 4 is an "input shaft" for the clutch unit 5 or 6 while the output shaft 7 or 8 is an "output shaft" for the clutch unit 5 or 6.

In the above-described embodiment, the torque fuse structure of the present invention is applied to each of the left and right clutch units 5 and 6 of the differential mechanism 10 designed for distributing rotational drive power to the left and right wheels (left and right rear wheels). However, the present invention is not so limited, and the torque fuse structure of the present invention is applicable to other types of power transmission devices. For example, the torque fuse structure of the present invention is applicable to a clutch unit for directly coupling rotation of the vehicle engine to the rear-wheel differential mechanism.

The invention claimed is:

1. A power transmission apparatus for a vehicle, comprising:
   an input shaft to which is transmitted rotary motion from a drive source;
   a clutch for transmitting rotary motion of the input shaft by disconnectably connecting drive power transmission; and
   an output shaft connected to the clutch,
   characterized in that the input shaft is spline-connected at one end thereof to an input-side rotation member of the clutch for rotating together with the input-side rotation member of the clutch,
   in that the input-side rotation member of the clutch includes a boss portion that includes a spline portion spline-connected to the one end of the input shaft, and a fitting portion extending further from the spline portion in an axial direction into contact with an outer periphery of the input shaft, and
   in that a portion of the input shaft that corresponds to the fitting portion has a recess formed therein for functioning as a torque fuse.

2. The power transmission apparatus for a vehicle as claimed in claim 1, which is a differential mechanism for distributing rotation of a drive shaft, to which is transmitted the rotary motion from the drive source, to left and right wheels, and
   wherein the differential mechanism includes: a driving bevel gear rotatable integrally with the drive shaft; a driven bevel gear meshing with the driving bevel gear; a center shaft extending in a direction intersecting the drive shaft and rotatable integrally with the driven bevel gear; left and right clutch units disposed to left and right of the center shaft; and left and right output shafts for transmitting outputs of the left and right clutch units to the left and right wheels, respectively,
   wherein the center shaft includes: a middle large-diameter portion; left and right medium-diameter portions located to left and right of the large-diameter portion; and left- and right-end small-diameter portions adjoining the left and right medium-diameter portions, the driven bevel gear being fixed to the large-diameter portion,
   wherein the input shaft is the center shaft, the clutch is the left or right clutch unit, and the output shaft is the left or right output shaft,
   wherein the boss portion of the input-side rotation member of the clutch is spline-connected to the small-diameter portion of the center shaft, and
   wherein the recess functioning as the torque fuse is formed in the medium-diameter portion of the center shaft.

3. The power transmission apparatus for a vehicle as claimed in claim 1, wherein the recess functioning as the torque fuse is formed in correspondence with a portion of the fitting portion adjoining the spline portion.

4. The power transmission apparatus for a vehicle as claimed in claim 2, wherein the recess functioning as the torque fuse is formed in correspondence with a portion of the fitting portion adjoining the spline portion.

* * * * *